(12) United States Patent
Simons et al.

(10) Patent No.: US 8,933,188 B2
(45) Date of Patent: Jan. 13, 2015

(54) LOW MISTING LAMINATING ADHESIVES

(75) Inventors: J. Brandon Simons, Raleigh, NC (US); Grant B. Kenion, Fuquay-Varina, NC (US)

(73) Assignee: Henkel US IP LLC, Rocky Hill, CT (US)

( * ) Notice: Subject to any disclaimer, the term of this patent is extended or adjusted under 35 U.S.C. 154(b) by 697 days.

(21) Appl. No.: 10/986,591

(22) Filed: Nov. 12, 2004

(65) Prior Publication Data

US 2006/0105187 A1  May 18, 2006

(51) Int. Cl.
*C08G 18/40* (2006.01)

(52) U.S. Cl.
USPC .... 528/59; 156/331.4; 156/331.7; 428/423.1; 428/423.7; 428/424.2; 428/424.8; 428/425.8; 528/60; 528/65; 528/66; 528/75; 528/76; 528/80; 528/83

(58) Field of Classification Search
USPC ............ 156/331.4, 331.7; 528/59, 60, 65, 66, 528/75, 76, 80, 83; 428/423.1, 423.7, 428/424.2, 424.8, 425.8
See application file for complete search history.

(56) References Cited

U.S. PATENT DOCUMENTS

| | | | |
|---|---|---|---|
| 3,499,009 A | | 3/1970 | Odinak et al. |
| 3,886,122 A * | | 5/1975 | Fabris et al. .................... 528/53 |
| 4,439,593 A * | | 3/1984 | Kelso et al. ...................... 528/45 |
| 4,859,791 A * | | 8/1989 | Nodelman et al. ............... 560/91 |
| 5,763,527 A * | | 6/1998 | Chen et al. ..................... 524/590 |
| 5,998,538 A | | 12/1999 | Meckel et al. |
| 6,299,715 B1 | | 10/2001 | Langsdorf et al. |
| 6,353,078 B1 | | 3/2002 | Murata et al. |
| 6,482,523 B1 | | 11/2002 | Morikawa et al. |
| 6,589,384 B2 | | 7/2003 | Chen et al. |
| 6,617,031 B1 | | 9/2003 | Glasbrenner |
| 6,833,044 B2 | | 12/2004 | Imai et al. |
| 2002/0006484 A1 | | 1/2002 | Ramalingam |
| 2003/0047279 A1 | | 3/2003 | Ramalingam |
| 2003/0215646 A1 | | 11/2003 | Glasbrenner |

FOREIGN PATENT DOCUMENTS

| | | |
|---|---|---|
| DE | 11 78 585 | 9/1964 |
| GB | 1032233 | 6/1966 |
| WO | WO 01/00944 | 1/2001 |

OTHER PUBLICATIONS

EP Application No. 05 851 470.4: European Patent Office Communication dated Jun. 13, 2012, 8 pages.

* cited by examiner

*Primary Examiner* — John Cooney
(74) *Attorney, Agent, or Firm* — James E. Piotrowski

(57) ABSTRACT

The tendency of a two component laminating adhesive based on polyurethane chemistry to form a mist of fine droplets when applied at a high line speed may be reduced by including both a high functionality polyol and a lower functionality polymeric polyol in Component B which is combined and reacted with an isocyanate-functionalized polyurethane prepolymer in Component A.

19 Claims, 1 Drawing Sheet

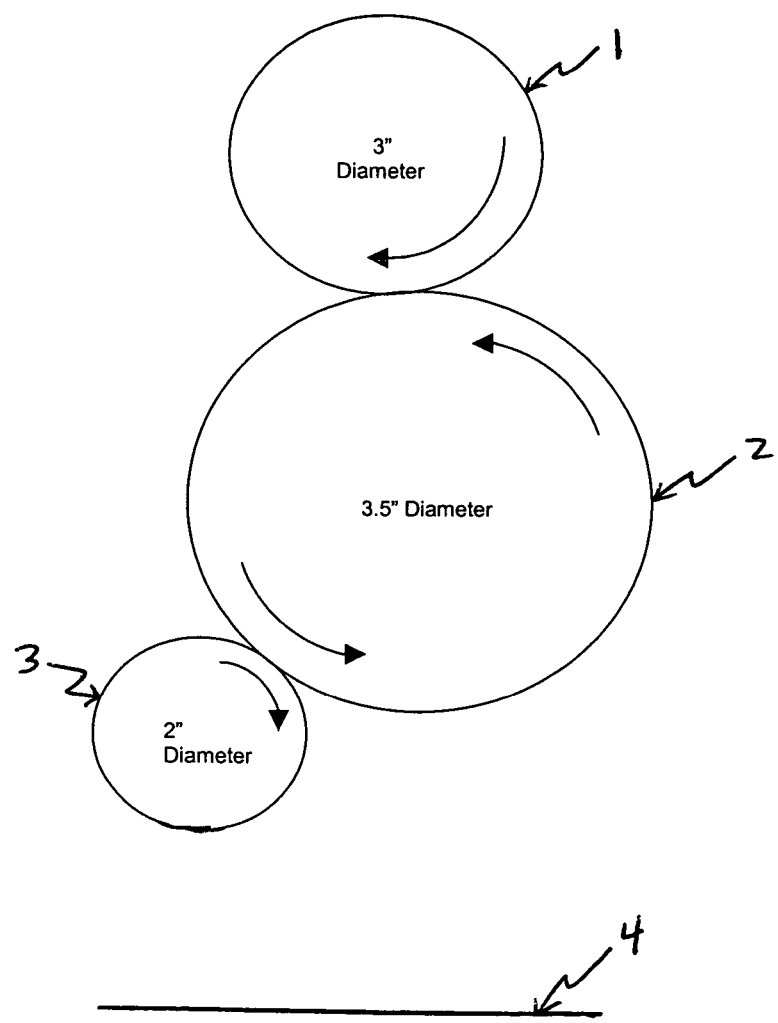

LOW MISTING LAMINATING ADHESIVES

FIELD OF THE INVENTION

The present invention provides two component laminating adhesives based on polyurethanes in which one component comprises an isocyanate-functionalized compound such as an NCO-terminated polyurethane prepolymer and a second component comprises a mixture of polyols, at least one of which contains four or more hydroxyl groups per molecule and at least one of which contains two or three hydroxyl groups per molecule. The two components are combined and the resulting adhesive used to laminate a thin polymeric film or foil to another thin polymeric film or foil. Such adhesives exhibit a reduced tendency to generate mist when being used in a laminating operation.

BACKGROUND OF THE INVENTION

Laminating adhesives are widely used in the manufacture of film/foil laminates. Among many such known systems, the use of polyurethane based laminating adhesives is preferred because of their many desirable properties including good adhesion, peel strength, heat seal strength and resistance to aggressive filling goods. Typically, an isocyanate-containing polyurethane prepolymer obtained by the reaction of excess diisocyanate with a polyether and/or polyester containing two or more active hydrogen groups per molecule is used in combination with a second component. The second component usually is a polyether polyol and/or polyester polyol. The two components are combined in a predetermined ratio and applied on one of the film or foil substrates and laminated to the second substrate. Application may be from a solution in a suitable solvent using gravure or smooth roll coating cylinders or from a solvent-free state using special application machinery.

Solventless laminating adhesives (adhesives that can be applied at 100% solids and that do not contain either organic solvents or water) have a distinct advantage in that they can be applied and run at very high line speeds. This is due to the fact that no organic solvent or water has to be removed from the adhesive by drying. Solvent- or water-based laminating adhesives are limited to the application speed that the solvent or water can be effectively dried in an oven.

Typical line speeds for solvent-based and water-based laminating adhesives are 300 to 600 feet per minute due to the drying restrictions. Solventless adhesives, on the other hand, can be applied at 900 to even 1500 feet per minute. Solventless laminating adhesives thus have a distinct advantage over solvent-based or water-borne adhesives.

In order that the proper coating weight of laminating adhesive is applied to the substrate, the adhesive must be "metered down" by transfer rolls to the application web or substrate. This is generally achieved by transferring the adhesive from a "puddle" between two rolls to a second and sometimes third or fourth roll before applying to the substrate. The subsequent transfer rolls turn at a speed higher than the former roll so that the adhesive is less on each subsequent roll. Since these rolls are rotating at speeds up to 1000 rpm's, incomplete transfer of the adhesive typically occurs with the formation of adhesive "droplets" that are released into the air around the metering rolls. These adhesive "droplets" are seen as aerosol droplets that are commonly called "adhesive mist".

Adhesive misting is undesirable for several reasons. The adhesive droplets tend to collect on machinery and other surfaces to form coatings that need to be periodically removed or cleaned. The droplets also can clog or constrict air vents and other exhaust or ventilation equipment. If the adhesive mist contains materials which are hazardous to human health due to toxicity or allergic sensitization, care must be taken to avoid worker exposure to such materials by inhalation of the adhesive droplets or deposition of the droplets on exposed skin or mucous membranes. Also, misting of the adhesive results in a loss of the adhesive, leading to increases in the cost of operating a lamination line.

SUMMARY OF THE INVENTION

The present invention provides a two component laminating adhesive comprising Component A and Component B, wherein Component A comprises an isocyanate-functionalized compound and Component B comprises at least one high functionality polyol containing at least four hydroxyl groups per molecule and at least one lower functionality polymeric polyol. Using such high functionality polyols in combination with lower functionality polymeric polyols results in Component B showing a reduced tendency to form mists when used in a high speed adhesive application process, as compared to a Component B which contains only lower functionality polymeric polyol and no high functionality polyol. Mixtures of Component B and Component A in accordance with the present invention similarly display reduced misting characteristics. Such low misting adhesive systems can be applied to substrates by roll coating or other methods used to apply adhesives at high line speeds (e.g., 1000 fpm or more). High line speeds permit more efficient use of plant equipment in the production of laminated flexible films and other products; such high line speeds are not attainable with conventional solventless adhesives which have a greater propensity to form mists than the adhesive systems of the present invention.

A laminate may be formed by combining Components A and B to provide an adhesive and then using the adhesive to adhere one polymeric film or metallic foil to another polymeric film or metallic foil. The adhesive layer between the film or foil layers of the laminate is then cured.

BRIEF DESCRIPTION OF THE DRAWING

FIG. 1 illustrates in schematic form an apparatus useful for measuring the propensity of an adhesive to form mist when applied at a high line speed.

DETAILED DESCRIPTION OF CERTAIN EMBODIMENTS OF THE INVENTION

Component A

Component A of the present invention contains at least one compound having two or more isocyanate groups per molecule. The isocyanate groups may be free —NCO groups, but can also be blocked or masked —NCO groups. One particular embodiment of the invention employs one or more isocyanate-functionalized polyurethane prepolymers in Component A. In the context of the present invention, a polyurethane prepolymer is a compound such as results, for example, from the reaction of a polyol component (or other active hydrogen-functionalized compound) with at least one isocyanate having a functionality of at least two. This reaction can take place without solvent or in a solvent. The term "polyurethane prepolymer" embraces not only compounds having a relatively low molecular weight, such as are formed, for example, from the reaction of a polyol with an excess of polyisocyanate, but also oligomeric or polymeric compounds. "Perfect" polyurethane prepolymers, containing a single polyol moiety capped at each end or terminus with a polyisocyanate moiety and very little, if any, free polyisocyanate monomer or oligomeric or polymeric compounds (containing two or more polyol moieties per molecule) may also be utilized.

Molecular weight figures based on polymeric compounds refer, unless otherwise indicated, to number average molecular weight ($M_n$). The polyurethane prepolymers used in the context of the present invention generally may have a molecular weight of from 500 to 27,000, alternatively from 700 to 15,000, or alternatively from 700 to 8,000 g/mol. Likewise embraced by the term "polyurethane prepolymers" are compounds formed, for example, from the reaction of a trivalent or tetravalent polyol with a molar excess of diisocyanate, relative to the polyol. In this case one molecule of the resultant compound bears two or more isocyanate groups.

Polyurethane prepolymers having isocyanate end groups are well known in the art. They can be crosslinked or chain-extended with suitable curing agents—usually polyfunctional alcohols—in a simple way to form substances of higher molecular weight.

To obtain polyurethane prepolymers having terminal isocyanate groups it is customary to react polyfunctional alcohols with an excess of polyisocyanates, generally at least predominantly diisocyanates. In this case the molecular weight can be controlled at least approximately by way of the ratio of OH groups to isocyanate groups. While a ratio of OH groups to isocyanate groups of 1:1 or near to 1:1 often leads to substances with high molecular weights, it is the case with a ratio of approximately 1:2, for example, when using diisocyanates, that one diisocyanate molecule is attached on average to each OH group, so that in the course of the reaction, in the ideal case, there is no oligomerization or chain extension.

Excess unreacted polyisocyanate monomer may be removed from the polyurethane prepolymer reaction product initially obtained by any known method such as, for example, distillation to provide a prepolymer having a desirably low level of polyisocyanate monomer (e.g., less than 1 weight %).

Polyurethane prepolymers are customarily prepared by reacting at least one polyisocyanate, preferably a diisocyanate, and at least one component having functional groups which are reactive toward isocyanate groups, generally a polyol component, which is preferably composed of diols. The polyol component may contain only one polyol, although it is also possible to use a mixture of two or more polyols as the polyol component. By a polyol is meant a polyfunctional alcohol, i.e., a compound having more than one OH group in the molecule. By "functional groups which are reactive toward isocyanate groups" are meant, in the context of the present text, functional groups which can react with isocyanate groups to form at least one covalent bond.

Suitable reactive functional groups containing active hydrogen may be monofunctional in the sense of a reaction with isocyanates: OH groups or mercapto groups, for example. Alternatively, they may also be difunctional with respect to isocyanates (primary amino groups, for example). A molecule containing a primary amino group, accordingly, also has two functional groups which are reactive toward isocyanate groups. In this context it is unnecessary for a single molecule to have two separate functional groups that are reactive toward isocyanate groups. What is critical is that the molecule is able to connect with two isocyanate groups with the formation in each case of one covalent bond.

As the polyol component is possible to use a multiplicity of polyols. These are, for example, aliphatic alcohols having from 2 to 4 OH groups per molecule. The OH groups may be primary or secondary. Examples of suitable aliphatic alcohols include ethylene glycol, propylene glycol, butane-1,4-diol, pentane-1,5-diol, hexane-1,6-diol, heptane-1,7-diol, octane-1,8-diol and their higher homologs or isomers such as result in a formal sense from a stepwise extension of the hydrocarbon chain by one $CH_2$ group in each case or with the introduction of branches into the carbon chain. Likewise suitable are higher polyfunctional alcohols such as, for example, glycerol, trimethylolpropane, pentaerythritol and also oligomeric ethers of said substances with themselves or in a mixture of two or more of said ethers with one another.

As the polyol component it is additionally possible to use reaction products of low molecular weight polyfunctional alcohols with alkylene oxides, referred to as polyether polyols. The alkylene oxides have preferably 2 to 4 carbon atoms. Suitable examples are the reaction products of ethylene glycol, propylene glycol, the isomeric butanediols, hexanediols or 4,4'-dihydroxy-diphenylpropane with ethylene oxide, propylene oxide or butylene oxide, or with mixtures of two or more thereof. Also suitable, furthermore, are the reaction products of polyfunctional alcohols, such as glycerol, trimethylolethane or trimethylolpropane, pentaerythritol, sugars or sugar alcohols, or mixtures of two or more thereof, with the stated alkylene oxides to form polyether polyols. Particularly suitable polyether polyols are those having a molecular weight from about 100 to about 10,000, preferably from about 200 to about 5,000. Likewise suitable as the polyol component are polyether polyols such as are formed, for example, from the polymerization of tetrahydrofuran.

The polyether polyols may be synthesized using methods known to the skilled worker, by reaction of the starting compound having a reactive hydrogen atom with alkylene oxides: for example, ethylene oxide, propylene oxide, butylene oxide, styrene oxide, tetrahydrofuran or epichlorohydrin or mixtures of two or more thereof. Examples of suitable starting compounds are water, ethylene glycol, propylene 1,2-glycol or 1,3-glycol, butylene 1,4-glycol or 1,3-glycol, hexane-1,6-diol, octane-1,8-diol, neopentylglycol, 1,4-hydroxymethylcyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononyl-phenol, resorcinol, hydroquinone, 1,2,2- or 1,1,2-tris(hydroxyphenyl)ethane, ammonia, methylamine, ethylenediamine, tetra- or hexamethyleneamine, triethanolamine, aniline, phenylenediamine, 2,4- and 2,6-diaminotoluene and polyphenylpolymethylenepolyamines (such as are obtainable by aniline-formaldehyde condensation), or mixtures of two or more thereof.

Likewise suitable for use as the polyol component are polyether polyols which have been modified by vinyl polymers. Products of this kind are available, for example, by polymerizing styrene or acrylonitrile, or a mixture thereof, in the presence of polyether polyols.

Polyester polyols having a molecular weight of from about 200 to about 10,000 are likewise suitable as the polyol component. Thus, for example, it is possible to use polyester polyols formed by reacting low molecular weight alcohols, especially ethylene glycol, diethylene glycol, neopentyl glycol, hexanediol, butanediol, propylene glycol, glycerol or trimethylolpropane, with caprolactone. Likewise suitable as polyfunctional alcohols for preparing polyester polyols are 1,4-hydroxymethylcyclohexane, 2-methyl-1,3-propanediol, butane-1,2,4-triol, triethylene glycol, tetraethylene glycol, polyethylene glycol, dipropylene glycol, polypropylene glycol, dibutylene glycol and polybutylene glycol.

Further suitable polyester polyols are preparable by polycondensation. For instance, difunctional and/or trifunctional alcohols can be condensed with a substoichiometric amount of dicarboxylic acids and/or tricarboxylic acids, or their reactive derivatives, to form polyester polyols. Examples of suitable dicarboxylic acids are adipic acid or succinic acid and their higher homologs having up to 16 carbon atoms, unsaturated dicarboxylic acids such as maleic acid or fumaric acid, and also aromatic dicarboxylic acids, particularly the isomeric phthalic acids, such as phthalic acid, isophthalic acid or terephthalic acid. Examples of suitable tricarboxylic acids are citric acid or trimellitic acid. These acids may be used individually or as mixtures of two or more thereof. Particularly suitable in the context of the invention are polyester polyols formed from at least one of said dicarboxylic acids and glycerol which have a residual OH group content. Particularly suitable alcohols are hexanediol, ethylene glycol, diethylene glycol or neopentyl glycol or mixtures of two or more thereof. Particularly suitable acids are isophthalic acid or adipic acid or their mixtures.

Polyester polyols of high molecular weight include, for example, the reaction products of polyfunctional alcohols, preferably difunctional alcohols (together where appropriate with small amounts of trifunctional alcohols) and polyfunctional carboxylic acids, preferably difunctional carboxylic acids. Instead of free polycarboxylic acids use may also be made (if possible) of the corresponding polycarboxylic anhydrides or corresponding polycarboxylic esters with alcohols having preferably 1 to 3 carbon atoms. The polycarboxylic acids may be aliphatic, cycloaliphatic, aromatic or heterocyclic or both. They may where appropriate be substituted, by alkyl groups, alkenyl groups, ether groups or halogens, for example. Examples of suitable polycarboxylic acids include succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid or trimer fatty acid or mixtures of two or more thereof. Where appropriate, minor amounts of monofunctional fatty acids may be present in the reaction mixture.

The polyester polyols may where appropriate contain a small fraction of carboxyl end groups. Polyester polyols obtainable from lactones, 6-caprolactone for example, or hydroxy-carboxylic acids, co-hydroxycaproic acid for example, may likewise be used.

Polyacetals and polyester ether polyols are likewise suitable as the polyol component. By polyacetals are meant compounds obtainable from glycols reacted with aldehydes, for example, diethylene glycol or hexanediol or a mixture thereof condensed with formaldehyde. Polyacetals which can be used in the context of the invention may likewise be obtained by the polymerization of cyclic acetals.

Further suitable polyols include polycarbonates. Polycarbonates can be obtained, for example, by reacting diols, such as propylene glycol, butane-1,4-diol or hexan-1,6-diol, diethylene glycol, triethylene glycol or tetraethylene glycol, or mixtures of two or more thereof, with diaryl carbonates, for example, diphenyl carbonate, or phosgene.

Likewise suitable as the polyol component are polyacrylates which carry OH groups. These polyacrylates are obtainable, for example, by polymerizing ethylenically unsaturated monomers which carry an OH group. Monomers of this kind are obtainable, for example, by esterifying ethylenically unsaturated carboxylic acids and difunctional alcohols, the alcohol generally being present in a slight excess. Examples of ethylenically unsaturated carboxylic acids suitable for this purpose are acrylic acid, methacrylic acid, crotonic acid or maleic acid. Corresponding esters carrying OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropylmethacrylate or mixtures of two or more thereof.

In addition to the aforedescribed polyol compounds, polyisocyanates are important building blocks of the polyurethane prepolymers which can be used in Component A of the two component laminating adhesives of the present invention. These include compounds of the general structure O=C=N—X—N=C=O, where X is an aliphatic, alicyclic or aromatic radical, such as an aliphatic or alicyclic radical having from 4 to 18 carbon atoms.

As suitable polyisocyanates mention may be made, for example, of 1,5-naphthylene diisocyanate, 4,4'-diphenylmethane diisocyanate (MDI), hydrogenated MDI ($H_{12}$MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate and also diisocyanates having reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate.

Sulfur-containing polyisocyanates are obtained, for example, by reacting 2 mol of hexamethylene diisocyanate with 1 mol of thiodiglycol or dihydroxydihexyl sulfide. Further diisocyanates which can be used are, for example, trimethylhexamethylene diisocyanate, 1,4-diisocyanatobutane, 1,12-diisocyanatododecane and dimer fatty acid diisocyanate. Particularly suitable are the following: tetramethylene, hexamethylene, undecane, dodecamethylene, 2,2,4-trimethylhexane, 1,3-cyclohexane, 1,4-cyclohexane, 1,3- or 1,4-tetramethylxylene, isophorone, 4,4-dicyclohexylmethane and lysine ester diisocyanates. In one embodiment of the invention, tetramethylxylylene diisocyanate (TMXDI) is utilized as the polyisocyanate.

Examples of suitable isocyanates having a functionality of at least three are the trimerization and oligomerization products of the polyisocyanates already mentioned above, such as are obtainable, with the formation of isocyanurate rings, by appropriate reaction of polyisocyanates, preferably of diisocyanates. Where oligomerization products are used, those particularly suitable have a degree of oligomerization of on average from about 3 to about 5.

Isocyanates suitable for the preparation of trimers are the diisocyanates already mentioned above, particular preference being given to the trimerization products of the isocyanates HDI, MDI or IPDI.

Likewise suitable for use are the polymeric isocyanates, such as are obtained, for example, as a residue in the distillation bottoms from the distillation of diisocyanates. Particularly suitable in this context is the polymeric MDI as is obtainable as a distillation residue from the distillation of MDI.

Component A preferably is formulated to have a viscosity of not greater than about 10,000 cps (more preferably, not greater than about 5000 cps; most preferably, not greater than about 3500 cps) at 25 degrees C. and a viscosity of not greater than about 2500 cps (more preferably, not greater than about 2000 cps) at 60 degrees C.

Component B

Component B of the two component laminating adhesive of the present invention contains at least one compound having four or more hydroxyl groups per molecule (a "high functionality polyol") and at least one polymeric compound having two or three hydroxyl groups per molecule (a "lower functionality polymeric polyol").

In one embodiment of the invention, the high functionality polyol contains two pairs of hydroxyl groups per molecule, wherein the hydroxyl groups within each pair are separated by two or three carbon atoms and the two pairs of hydroxyl groups are separated by at least eight atoms. The hydroxyl groups preferably are primary and/or secondary hydroxyl groups. In one embodiment of the invention, the high functionality polyol contains both primary and secondary hydroxyl groups. In another embodiment of the invention, the hydroxyl groups are attached to aliphatic carbon atoms.

Suitable high functionality polyols include, but are not limited to, polyester polyols, polyether polyols and polyester ether polyols (sometimes also referred to as polyether ester polyols).

Illustrative high functionality polyester polyols suitable for use in the present invention may correspond to the following general structure (I):

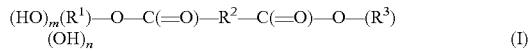

$$(HO)_m(R^1)-O-C(=O)-R^2-C(=O)-O-(R^3)(OH)_n \quad (I)$$

wherein m and n are integers which are the same or different and which each have a value of at least 1, m+n=at least 4, and $R^1$, $R^2$ and $R^3$ are hydrocarbon radicals (preferably containing from 2 to 20 carbon atoms). $R^1$ has a valency of m+1 (with m OH groups being attached thereto), $R^2$ has a valency of 2, and $R^3$ has a valency of n+1 (with n OH groups being attached thereto). The hydrocarbon radicals may be linear or branched, aliphatic cycloaliphatic, aromatic or aralkyl, saturated or unsaturated. For example, $R^1$ and $R^3$ may each be a —CH$_2$—CH—CH$_2$— group. $R^2$ may, for example, be a —(CH$_2$)$_o$— moiety, where o is an integer of from 2 to 18.

High functionality polyester polyols corresponding to the above-mentioned general structure (I) may be prepared by reacting a molar excess of one or more polyols bearing two (preferably three) or more hydroxyl groups per molecule with a dicarboxylic acid or dicarboxylic acid diester, for example. Suitable polyols for such purpose include glycerine, trimethylolpropane, trimethylolethane, pentaerythritol, sugar alcohols, sugars, glycosides and also oligomeric ethers of said substances with themselves or in a mixture of two or more of said ethers with one another. As the polyol component it is additionally possible to use reaction products of such polyols with alkylene oxides, referred to as polyether polyols. The alkylene oxides have preferably 2 to 4 carbon atoms. Suitable examples are the reaction products of polyols such as glycerine, trimethylolethane, trimethylolpropane, pentaerythritol, sugars, glycosides or sugar alcohols, or mixtures of two or more thereof with ethylene oxide, propylene oxide or butylene oxide, or with mixtures of two or more such alkylene oxides. Particularly suitable polyether polyols are those having a molecular weight from about 100 to about 5,000, preferably from about 100 to about 1,000. The dicarboxylic acid reacted with the aforementioned polyol to form the high functionality polyester polyol may be any linear or branched, aliphatic, aromatic, alicyclic, saturated or unsaturated organic compound containing two carboxylic acid groups per molecule. In one embodiment of the invention, a linear aliphatic saturated dicarboxylic acid is employed such as, for example, succinic acid, adipic acid, azelaic acid, sebacic acid, dodecanedicarboxylic acid, and the like. The dicarboxylic acid may, for example, correspond to the structure HO—C(=O)—(CH$_2$)$_m$—C(=O)—OH, where n=2-18. Preferably, the polyol and the dicarboxylic acid are reacted at a molar ratio of about 2:1. The reaction may be carried out under conditions effective to remove the water formed as a result of the condensation between the hydroxyl groups of the polyol and the acid groups of the dicarboxylic acid. Catalysts may be employed to accelerate the rate of condensation.

Other exemplary high functionality polyester polyols suitable for use in the adhesives of the present invention have the following general structure (II):

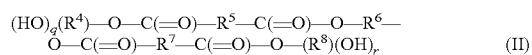

$$(HO)_q(R^4)-O-C(=O)-R^5-C(=O)-O-R^6-O-C(=O)-R^7-C(=O)-O-(R^8)(OH)_r \quad (II)$$

wherein q and r are integers which are the same or different and which each have a value of at least 1, q+r=at least 4, $R^4$, $R^5$, $R^7$ and $R^8$ are hydrocarbon radicals which may be the same or different (preferably containing from 2 to 20 carbon atoms), and $R^6$ is a divalent radical selected from the group consisting of hydrocarbon radicals and polyoxyalkylene radicals. $R^4$ has a valency of q+1 (with q OH groups being attached thereto), $R^5$ and $R^7$ each are divalent, and $R^8$ has a valency of r+1 (with r OH groups being attached thereto). The hydrocarbon radicals may be linear or branched, aliphatic cycloaliphatic, aromatic or aralkyl, saturated or unsaturated. For example, $R^4$ and $R^8$ may each be a —CH$_2$—CH—CH$_2$— group. $R^5$, $R^6$ and $R^7$ may, for example, each be a —(CH$_2$)$_o$— moiety, where o is an integer of from 2 to 18. $R^6$ may alternatively be a polyoxyalkylene radical such as, for example, a radical corresponding to the structure —[(CH$_2$)$_s$—CHR$^9$—O]$_t$—(CH$_2$)$_u$—CHR$^{10}$—, wherein s and u are integers of 1 to 3, t is at least 1, and $R^9$ and $R^{10}$ are independently selected from the group consisting of H, methyl or ethyl (where $R^9$ may be the same or different in each —(CH$_2$)$_s$—CHR$^9$—O— moiety when t is greater than 1). For instance, the polyoxyalkylene radical may be selected from the group consisting of polyoxyethylene radicals, polyoxypropylene radicals and polyoxytetramethylene radicals. High functionality polyester polyols of general structure (II) may generally be prepared by reacting a difunctional alcohol with a dicarboxylic acid so as to react each hydroxyl group of the alcohol with one molecule of the dicarboxylic acid. The remaining unreacted acid groups derived from the dicarboxylic acid are then reacted with one or more polyols containing three or more hydroxyl groups per molecule. The dicarboxylic acid and polyol may, for example, be any of the exemplary compounds discussed hereinabove in connection with the high functionality polyester polyols of general structure (I). The difunctional alcohol may be any monomeric, oligomeric, or polymeric compound containing two hydroxyl groups per molecule such as, for example, ethylene glycol, diethylene glycol, triethylene glycol, polyethylene glycol, 1,2-propylene glycol, 1,3-propylene glycol, dipropylene glycol, tripropylene glycol, polypropylene glycol, neopentyl glycol, 2-methyl-1,3-propanediol, 1,4-butanediol, polytetrahydrofuran diol, bis-phenol A, bisphenol F, and the like. In one embodiment of the invention, a polyether glycol (in particular, a polypropylene glycol) having a molecular weight of from about 200 to about 3000 is utilized.

Suitable high functionality polyols may also be prepared by esterification of a compound containing four or more carboxylic acid groups per molecule with a compound containing two hydroxyl groups per molecule (such as, for example, ethylene glycol, propylene glycol, diethylene glycol, butylene glycol, neopentyl glycol, 2-methyl-1,3-propanediol, 1,6-hexanediol and mixtures thereof) under conditions such that each of the carboxylic acid groups is reacted with a molecule of the compound containing two hydroxyl groups per molecule. Polycaprolactone polyols containing four or more hydroxyl groups per molecule, such as the tetrafunctional polycaprolactones sold under the trademark CAPA 4101 by Solvay S.A. may also be used as the high functionality polyol component of the present invention.

The high functionality polyol may also be a polyether polyol containing four or more hydroxyl groups per molecule. Suitable polyether polyols include reaction products of low molecular weight polyfunctional alcohols with alkylene oxides. The alkylene oxides have preferably 2 to 4 carbon atoms. Suitable examples are the reaction products of polyfunctional alcohols containing four or more hydroxyl groups per molecule such as pentaerythritol, sugars, glycosides or sugar alcohols, or mixtures of two or more thereof with ethylene oxide, propylene oxide or butylene oxide, or with mixtures of two or more such alkylene oxides. In one desirable embodiment of the invention, the alkylene oxide employed is propylene oxide and/or a higher alkylene oxide, as polyether polyols prepared using ethylene oxide alone or a mixture of alkylene oxides containing a substantial proportion of ethylene oxide (e.g., more than 25 mole %) tend to have poor compatibility with the lower functionality polymeric polyols generally preferred for use in Component B of the present invention. Particularly suitable polyether polyols are those having a molecular weight from about 200 to about 5,000, preferably from about 200 to about 2,000.

Although the amount of high functionality polyol in Component B is not believed to be critical, generally speaking an amount of such polyol is included which is effective to cause a decrease in the tendency of the laminating adhesive to form a mist (i.e., fine droplets) when being applied to a substrate at a relatively high line speed (e.g., 1000 fpm or higher). Typically, Component B comprises at least 15% by weight but no greater than about 75% by weight of high functionality polyol(s).

The lower functionality polymeric polyol or polyols used in combination with the high functionality polyol(s) may, for example, be any of such compounds known in the art, including the difunctional and trifunctional polyester polyols, polyether polyols and polyester ether polyols conventionally used as ingredients in the formulation of two part laminating adhesives based on polyurethane chemistry. The polyester polyols previously described in connection with the synthesis of isocyanate-functionalized polyurethane prepolymers may generally also be used as the lower functionality polymeric polyol, for instance.

The lower functionality polymeric polyol may, for example, have a number average molecular weight of from about 200 to about 10,000. In another embodiment, the molecular weight is from about 200 to about 5,000.

Examples of suitable difunctional polyester polyols are those obtained by reacting dibasic acids or diester or anhydrides thereof such as terephthalic acid, isophthalic acid, orthophthalic acid, adipic acid, azaelaic acid and sebacic acid, dialkyl esters and anhydrides thereof and mixtures thereof with glycols such as ethylene glycol, propylene glycol, diethylene glycol, butylene glycol, neopentyl glycol, 2-methyl-1,3-propanediol, 1,6-hexanediol and mixtures thereof. Polycaprolactone polyols may also be used.

As the lower functionality polymeric polyol it is additionally possible to use reaction products of low molecular weight polyfunctional alcohols containing two or three hydroxyl groups per molecule with alkylene oxides, referred to as polyether polyols. Water may also be used as a starter molecule to provide difunctional polyether polyols. The alkylene oxides have preferably 2 to 4 carbon atoms. Suitable examples are the reaction products of polyfunctional alcohols such as ethylene glycol, diethylene glycol, triethylene glycol, propylene glycol, dipropylene glycol, tripropylene glycol, 1,4-butanediol, 1,3-butanediol, neopentyl glycol, glycerine, trimethylolethane, trimethylolpropane, or mixtures of two or more thereof with ethylene oxide, propylene oxide or butylene oxide, or with mixtures of two or more such alkylene oxides. Particularly suitable polyether polyols are those having a molecular weight from about 100 to about 5,000, preferably from about 100 to about 3,000.

The high functionality polyol(s) and lower functionality polymeric polyol(s) should be selected so as to be compatible with each other. That is, the mixture of the different polyols should be homogeneous in appearance and should not exhibit any tendency to phase separate at normal storage and use temperatures (e.g., about 15 degrees C. to about 100 degrees C.).

The composition of Component B in preferred embodiments of the invention is adjusted so as to provide a viscosity for Component B that does not exceed about 5000 cps (more preferably, about 4000 cps) at 25 degrees C. and/or a viscosity that does not exceed about 3000 cps (more preferably, about 2000 cps) at 40 degrees C.

The amounts of Component A and Component B used in the laminating adhesive systems of this invention will generally be adjusted so as to provide an NCO/active hydrogen equivalent ratio in the range of from about 1:1 to 10:1 in one embodiment of the invention, from about 1.05:1 to about 5:1 in another embodiment, and from about 1.1:1 to about 2:1 in yet another embodiment. Typically, the free isocyanate content (prior to any reaction between Component A and Component B) will be from about 1% to about 25% by weight based on the total weight of the two component adhesive. The weight ratio of Component A to Component B may vary within wide limits, with the optimum ratio being dependent upon the composition of each of Component A and Component B. For convenience, however, it will often be desirable to adjust the compositions of Component A and Component B such that the weight ratio of A:B is from about 4:1 to about 1:5 (or, in one embodiment, about 1:1). In preferred embodiments of the invention, the viscosity of the mixture of Component A and Component B when first combined does not exceed about 6000 cps (more preferably, about 3000 cps; most preferably, about 2000) at 40 degrees C. Typically, the mixed adhesive will have a working time of about 15 to 20 minutes. The viscosity of the adhesive preferably does not increase above about 6000 cps (more preferably, about 4500 cps) during the first 30 minutes after Component A and Component B are mixed and held at a temperature of 40 degrees C. The adhesive typically is utilized at a temperature within the range of about 25 to about 60 degrees C.

Where appropriate, in addition to the isocyanate-functionalized compound(s) and the polyester polyols previously described, the two component laminating adhesive of the invention may comprise one or more further additives. The additives may, for example, account for up to about 10% by weight of the overall two component adhesive.

The optional additives which can be used in the context of the present invention include solvents, water, catalysts, curing agents, accelerators, plasticizers, stabilizers, antioxidants, light stabilizers, fillers, dyes, pigments, fragrances, preservatives or mixtures thereof. In one embodiment of the invention, Component B additionally contains up to about 15% by weight (in another embodiment, up to about 10% by weight) of one or more monomeric polyols containing two or three hydroxyl groups per molecule. Exemplary monomeric polyols include glycerol and trimethylolpropane.

The film or films to be coated or adhered to each other using the two component formulations of the present invention may be comprised of any of the materials known in the art to be suitable for use in flexible packaging, including both polymeric and metallic materials as well as paper (including treated or coated paper). Thermoplastics are particularly preferred for use as at least one of the layers. The materials chosen for individual layers in a laminate are selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use in the present invention include, but not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), and acrylonitrile copolymers (AN).

The polymer surface may be treated or coated, if so desired. For example, a film of polymer may be metallized by depositing a thin metal vapor such as aluminum onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity. A coating of an inorganic oxide such as SiOx or AlOx may also be present on the polymer surface (for example, an SiOx- or AlOx-coated PET film).

One or more layers of the laminate may also comprise a metal foil, such as aluminum foil, or the like. The metal foil will preferably have a thickness of about 5 to 100 μm.

The individual films comprising the laminates of the present invention can be prepared in widely varying thicknesses, for example, from about 5 to about 200 microns. The films, foils, and laminating adhesive formulation can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. The resulting laminate may be rolled or wound onto a reel. The adhesive may be applied by conventional techniques; e.g., by a multi-roll application station.

One way of applying the adhesive composition of the present invention to a substrate such as a film or foil is through the use of a series of smooth surface rubber and steel transfer rollers on a solventless adhesive laminator. The components of the adhesive are mixed using Meter/Mix/Dispense (M/M/D) equipment capable of automatically measuring and mixing the correct amounts of the components and delivering the resulting mixture to the laminator. The mixed adhesive is deposited on the first two rollers and metered by the remaining rollers in the application station (typically, 3 to 5 rollers). The flow characteristics of the adhesive composition may be improved by heating the first two rollers to a temperature of from about 35 to about 60 degrees C. Typically, the final application roller is heated to a temperature of from about 40 to about 60 degrees C. Modifications of these temperatures may be required depending upon line speed, substrates and roller size.

Typically, the coating weight at which the adhesive formulation is applied to the surface of a film or foil is in the range of about 0.2 to about 5 g/m$^2$ (about 1 to about 3 g/m$^2$ or about 0.12 to about 3.1 lbs/3000 sq. ft, for example).

A second film or foil substrate is pressed against the substrate having the adhesive applied thereon by means of one or more nip rollers. Nip temperatures may be adjusted as needed depending upon line speed, thickness of the laminate, reactivity and other characteristics of the adhesive, and the substrates being laminated, but temperatures of from about 45 to about 90 degrees C. are typically suitable.

It may be desirable to heat the laminate at an elevated temperature (e.g., about 40° C. to about 100° C.) so as to accelerate full curing of the adhesive composition. Alternatively, the adhesive composition may be adjusted so as to be curable at approximately room temperature (e.g., about 20° C. to about 40° C.) over a period of from about 1 to about 14 days.

Generally speaking, the adhesive compositions of the present invention are believed to be largely chemically cured through the reaction of the formulation constituents containing isocyanate groups and the constituents containing hydroxyl or other active hydrogen groups. However, curing can also be accomplished at least in part through moisture curing. Although sufficient moisture may be inherently present on the film or foil surfaces for this purpose, water may also be deliberately introduced through conventional methods if so desired.

Laminates prepared in accordance with the present invention may be used for packaging purposes in the same manner as conventional or known flexible laminated packaging films. The laminates are particularly suitable for forming into flexible pouch-shaped container vessels capable of being filed with a foodstuff and retorted. For example, two rectangular or square sheets of the laminate may be piled in the desired configuration or arrangement; preferably, the two layers of the two sheets which face each other are capable of being heat-sealed to each other. Three peripheral portions of the piled assembly are then heat-sealed to form the pouch. Heat-sealing can easily be accomplished by means of a heating bar, heating knife, heating wire, impulse sealer, ultrasonic sealer, or induction heating sealer.

The foodstuff is thereafter packed in the so-formed pouch. If necessary, gasses injurious to the foodstuff such as air are removed by known means such as vacuum degasification, hot packing, boiling degasification, or steam jetting or vessel deformation. The pouch opening is then sealed using heat. The packed pouch may be charged to a retorting apparatus and sterilized by heating to a temperature greater than about 100° C.

EXAMPLES

Component A-1

A blend containing 70% by weight of a TDI-based prepolymer obtained from Air Products (7.45% NCO) and 30% by weight of an MDI-based prepolymer obtained from Bayer Chemical Co. (22.9% NCO). Component A-1 has an NCO content of 12% by weight.

Component A-2

A blend containing 92% by weight of an MDI-based prepolymer (16% NCO) obtained from Bayer Chemical Co. and 8% by weight of an aliphatic prepolymer obtained from Bayer Chemical Co. (22% NCO). Component A-2 has NCO content of 17% by weight.

Component B-1

A blend containing 31.8% by weight of a tetrafunctional polyester polyol (TFPP-1), 51.8% by weight of a difunctional polyester polyol derived from diethylene glycol and ortho-phthalic acid (hydroxyl number=110) and 16.4% by weight of a difunctional polyester polyol derived from diethylene glycol and adipic acid (hydroxyl number=210). TFPP-1 has a hydroxyl number of 740 and is made by reacting two moles of glycerine with one mole of adipic acid.

Component B-2

A blend containing 31.8% by weight TFPP-1, 51.8% by weight of a difunctional polyester polyol derived from diethylene glycol and ortho-phthalic acid (hydroxyl number=110), and 16.4% by weight of a difunctional polyester polyol derived from diethylene glycol and adipic acid (hydroxyl number=55).

Component B-3

A blend containing 50% by weight TFFP-1, 20% by weight of a difunctional polyester polyol derived from diethylene glycol and ortho-phthalic acid (hydroxyl number=110), and 30% by weight of a difunctional polyester polyol derived from diethylene glycol and adipic acid (hydroxyl number=55).

Component B-4

A blend of 50% by weight of a difunctional polyester polyol derived from diethylene glycol and ortho-phthalic acid (hydroxyl number=110) and 50% by weight of a difunctional polyester polyol derived from diethylene glycol and adipic acid (hydroxyl number=55).

Component B-5

A blend of 20% by weight TFPP-1, 40% by weight of a difunctional polyester polyol derived from diethylene glycol and ortho-phthalic acid (hydroxyl number=110) and 40% by weight of a difunctional polyester polyol derived from diethylene glycol and adipic acid (hydroxyl number=55).

Component B-6

A blend of 96% by weight difunctional polyester polyol obtained from Bayer Chemical Company having a hydroxyl number of 210 and 4% trimethylolpropane (a trifunctional polyol).

Component B-7

A blend of 33% by weight of a tetrafunctional polyester polyol (TFPP-2), 61.3% by weight of a difunctional polyester polyol derived from diethylene glycol and ortho-phthalic acid (hydroxyl number=110), and 5.7% by weight of trimethylolpropane. The TFPP-2 has a hydroxyl number of 158 and is prepared by reacting 2 moles of glycerine, 1 mole of polypropylene glycol having a number average molecular weight of 1025 and 2 moles of adipic acid.

Component B-8

A blend of 5 parts by weight pentaerythritol, 6 parts by weight trimethylolpropane and 65 parts by weight difunctional polyester polyol derived from diethylene glycol and ortho-phthalic acid (hydroxyl number=110). The pentaerythritol did not dissolve in the other components of the blend even after heating 1 hour at 150 degrees C.; Component B-8 was not further evaluated.

Component B-9

A blend of 5 parts by weight pentaerythritol, 6 parts by weight glycerol, and 65 parts by weight difunctional polyester polyol derived from diethylene glycol and ortho-phthalic acid (hydroxyl number=110). The pentaerythritol did not dissolve in the other components of the blend even after heating 1 hour at 150 degrees C.; Component B-9 was not further evaluated.

Component B-10

A blend of 35 parts by weight pentaerythritol ethoxylate (3 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-10 was not further evaluated.

Component B-11

A blend of 35 parts by weight pentaerythritol ethoxylate (15 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-11 was not further evaluated.

Component B-12

A blend of 35 parts by weight pentaerythritol propoxylate (5 moles PO/mole pentaerythritol, obtained from Aldrich), 6 parts by weight trimethylolpropane, and 65 parts by weight difunctional polyester polyol derived from diethylene glycol and ortho-phthalic acid (hydroxyl number=110).

Component B-13

A blend of 35 parts by weight pentaerythritol propoxylate (17 moles EO/mole pentaerythritol, obtained from Aldrich), 6 parts by weight trimethylolpropane, and 65 parts by weight difunctional polyester polyol derived from diethylene glycol and ortho-phthalic acid (hydroxyl number=110).

Component B-14

A blend of 35 parts by weight pentaerythritol ethoxylate/propoxylate (obtained from Aldrich), 6 parts by weight trimethylolpropane, and 65 parts by weight difunctional polyester polyol derived from diethylene glycol and ortho-phthalic acid (hydroxyl number=110). The components of the blend separated; Component B-14 was not further evaluated.

Component B-15

A blend of 35 parts by weight TFPP-2, 6 parts by weight trimethylolpropane, and 65 parts by weight polypropylene glycol having a molecular weight of about 2000 (hydroxyl no.=55.4).

Component B-16

A blend of 35 parts by weight TFPP-2, 6 parts by weight trimethylolpropane, and 65 parts by weight difunctional polyester polyol derived from diethylene glycol and adipic acid (hydroxyl number=55).

Component B-17

A blend of 35 parts by weight TFPP-2, 6 parts by weight trimethylolpropane, and 65 parts by weight trifunctional polyether polyol prepared from propylene oxide and a trifunctional starter molecule.

Component B-18

A blend of 35 parts by weight TFPP-2, 6 parts by weight trimethylolpropane, and 65 parts by weight polypropylene glycol (hydroxyl no.=264).

Component B-19

A blend of 35 parts by weight TFPP-2, 6 parts by weight trimethylolpropane, and 65 parts by weight difunctional polyester polyol obtained from diethylene glycol and adipic acid (hydroxyl no.=210).

Component B-20

A blend of 35 parts by weight TFPP-2, 6 parts by weight trimethylolpropane, 32.5 parts by weight difunctional polyester polyol obtained from diethylene glycol and adipic acid (hydroxyl no.=210), and 32.5 parts by weight polyester polyol obtained from diethylene glycol and adipic acid (hydroxyl no.=55).

Component B-21

A blend of 35 parts by weight TFPP-2, 6 parts by weight glycerol, and 65 parts by weight difunctional polyester polyol obtained from diethylene glycol and adipic acid (hydroxyl no.=210).

A laboratory method has been developed that measures the tendency of adhesives or adhesive components to mist when run on commercial equipment at high application speeds. This method uses an Inkometer Model 106 manufactured by Thwing-Albert Instrument Co. of Philadelphia, Pa. 19154. This instrument transfers adhesive from a reservoir to a rubber roll onto a brass roll. When run at 1000 revolutions per minute (rpm), the amount of adhesive that is misted into the air correlates well with what is observed using commercial solventless laminating equipment.

The Inkometer Model 106 is comprised of three rolls and is illustrated in cross-sectional schematic form in FIG. 1 (not drawn to scale).

The top roll (1) is constructed of rubber with a diameter of 3 inches. The middle roll (2) is a 3.5 inch brass roll and has controlled heating. The bottom roll (3) is a 2 inch diameter rubber roll. The middle roll is equilibrated to the adhesive application temperature. Then 2 milliliters of adhesive is applied between the bottom and middle roll with the middle roll turning at 150 revolutions per minute. After the adhesive equilibrates to the middle roll temperature (typically 15 seconds), the middle roll is increased to 1000 revolutions per minute for exactly 30 seconds. A pre-weighed sheet (4) of aluminum foil (6.5 inches by 8.5 inches and weighed in grams to 4 decimal places) is placed underneath the bottom roll to collect adhesive mist for exactly 30 seconds time at 1000 rpm. The foil is placed 3.5 inches below the lowest point of the circumference of the bottom roller. The machine is then turned off after 30 seconds and the weight of the foil plus misted adhesive is divided by the weight of the foil before the test.

Misting values were measured using the above-described method for Components B-1 through B-6 by themselves (Table 1).

TABLE 1

| Misting Values at 50 degrees C., 1000 fpm | |
|---|---|
| Component | Misting Value |
| Component B-1 (Invention) | 1.01 |
| Component B-2 (Invention) | 1.03 |
| Component B-3 (Invention) | 1.02 |
| Component B-4 (Comparative) | 1.18 |
| Component B-5 (Invention) | 1.02 |
| Component B-6 (Comparative) | 1.12 |
| Component B-12 (Invention) | 1.05 |
| Component B-13 (Invention) | 1.08 |
| Component B-15 (Invention) | 1.11 |
| Component B-16 (Invention) | 1.04 |
| Component B-17 (Invention) | 1.11 |
| Component B-18 (Invention) | 1.02 |
| Component B-19 (Invention) | 1.04 |
| Component B-20 (Invention) | 1.02 |
| Component B-21 (Invention) | 1.03 |

Misting values were also measured over a range of temperatures using the above-described method for the mixture of Component A-1 and Component B-6 (comparative example) in a 2:1 weight ratio and the mixture of Component A-2 and Component B-7 (example of the invention) in a 1:1 weight ratio. The results are shown in Table 2.

TABLE 2

Misting Values at 1000 fpm

| Temperature (degrees C.) | Component A-1/Component B-6 (Comparative) | Component A-2/ Component B-7 |
|---|---|---|
| 30 | 1.40 | 1.28 |
| 40 | 1.35 | 1.18 |
| 50 | 1.27 | 1.13 |

These results demonstrate that the tendency of an adhesive system to form mist at a high line speed may be significantly reduced by using a high functionality polyol in combination with a lower functionality polymeric polyol.

What is claimed is:

1. A low-misting two component adhesive for bonding layers of a flexible packaging laminate consisting of two co-reactive components, Component A and Component B, wherein
Component A comprises an isocyanate-functionalized compound and optionally solvent, water, catalyst, curing agent, accelerator, plasticizer, stabilizer, antioxidant, light stabilizer, filler, dye, pigment, fragrance, preservative, or mixtures thereof, and
Component B consists of about 15% by weight to about 75% by weight (based on the total weight of Component B) of at least one high functionality polyol containing at least four hydroxyl groups per molecule, said high functionality polyol being selected from the group consisting of:
(i) a polyester polyol of the formula $(HO)_m(R^1)$—O—C(=O)—$R^2$—C(=O)—O—$(R^3)(OH)_n$ wherein —O—$R^1(OH)_m$ and —O—$R^3(OH)_n$ are each, independently, residues selected from trimethylolpropane, pentaerythritol and polyols where $R^1$ and $R^3$ are each, independently, linear, aliphatic cyclic, or aromatic hydrocarbyls; $R^2$ is selected from $C_2$-$C_{20}$ hydrocarbyl radicals; each of m and n are at least one; and m+n is at least 4;
(ii) a polyester polyol of the formula $(HO)_q(R^4)$—O—C(=O)—$R^5$—C(=O)—O—$R^6$—O—C(=O)—$R^7$—C(=O)—O—$(R^8)(OH)_r$ wherein —O—$R^4(OH)_m$ and —O—$R^8(OH)_n$ are each, independently, selected from residues of trimethylolpropane, pentaerythritol and polyols where $R^4$ and $R^8$ are each, independently, linear, aliphatic cyclic, or aromatic hydrocarbyls; $R^5$ and $R^7$ are each, independently, $C_2$-$C_{20}$ hydrocarbyl radicals; $R^6$ is a polyoxyalkylene radical, linear aliphatic, cycloaliphatic or aryl group, q and r are at least one and q+r is at least 4; and
(iii) a polyester polyol that is the reaction product of (a) at least one of ethylene glycol, diethylene glycol, 1,6-hexanediol and (b) a carboxylic acid containing four or more carboxylic acid groups per molecule; and
at least one lower functionality polymeric polyol compatible with the at least one high functionality polyol and selected from the group consisting of difunctional polymeric polyols; trifunctional polymeric polyols; difunctional polymeric polyols and at least one monomeric polyol having three hydroxyl groups per molecule; and trifunctional polymeric polyols and at least one monomeric polyol having three hydroxyl groups per molecule; and combinations thereof; said difunctional and trifunctional polymeric polyols being selected from at least one of:
(a) one or more polyester polyols obtained from reacting one or more dibasic acid or diester or anhydride thereof with one or more of ethylene glycol, diethylene glycol, triethylene glycol, 1,6-hexanediol and polycaprolactone polyol; and
(b) one or more polyether polyols;
and optionally solvent, water, catalyst, curing agent, accelerator, plasticizer, stabilizer, antioxidant, light stabilizer, filler, dye, pigment, fragrance, preservative, or mixtures thereof;
wherein the at least one high functionality polyol is obtained by reacting a difunctional polyol and a dicarboxylic acid to form a carboxylic acid-functionalized diester and reacting the carboxylic acid-functionalized diester with a trifunctional polyol.

2. The two component laminating adhesive of claim 1 wherein said at least one lower functionality polymeric polyol is a polyester polyol.

3. A low-misting two component adhesive for bonding layers of a flexible packaging laminate consisting of two co-reactive components, Component A and Component B, wherein
Component A comprises an isocyanate-functionalized compound and optionally solvent, water, catalyst, curing agent, accelerator, plasticizer, stabilizer, antioxidant, light stabilizer, filler, dye, pigment, fragrance, preservative, or mixtures thereof, and
Component B consists of about 15% by weight to about 75% by weight (based on the total weight of Component B) of at least one high functionality polyol containing at least four hydroxyl groups per molecule, said high functionality polyol being selected from the group consisting of:
(i) a polyester polyol of the formula $(HO)_m(R^1)$—O—C(=O)—$R^2$—C(=O)—O—$(R^3)(OH)_n$ wherein —O—$R'(OH)_m$ and —O—$R^3(OH)_n$ are each, independently, residues selected trimethylolpropane, pentaerythritol and polyols where $R^1$ and $R^3$ are each, independently, linear, aliphatic cyclic, or aromatic hydrocarbyls; $R^2$ is selected from $C_2$-$C_{20}$ hydrocarbyl radicals; each of m and n are at least one and m+n is at least 4;
(ii) a polyester polyol of the formula $(HO)_q(R^4)$—O—C(=O)—$R^5$—C(=O)—O—$R^6$—O—C(=O)—$R^7$—C(=O)—O—$(R^8)(OH)_r$ wherein —O—$R^4(OH)_m$ and —O—$R^8(OH)_n$ are each, independently, selected from residues of trimethylolpropane, pentaerythritol and polyols where $R^4$ and $R^8$ are each, independently, linear, aliphatic cyclic, or aromatic hydrocarbyls; $R^5$ and $R^7$ are each, independently, $C_2$-$C_{20}$ hydrocarbyl radicals; $R^6$ is a polyoxyalkylene radical, linear aliphatic, cycloaliphatic or aryl group, q and r are at least one and q+r is at least 4; and
(iii) a polyester polyol that is the reaction product of (a) at least one of ethylene glycol, diethylene glycol, 1,6-hexanediol and (b) a carboxylic acid containing four or more carboxylic acid groups per molecule; and
at least one lower functionality polymeric polyol compatible with the at least one high functionality polyol and selected from the group consisting of difunctional polymeric polyols; trifunctional polymeric polyols; difunctional polymeric polyols and at least one monomeric polyol having three hydroxyl groups per molecule; and trifunctional polymeric polyols and at least one monomeric polyol having three hydroxyl groups per molecule; and combinations thereof;

said at least one lower functionality polymeric polyol is a polyether polyol and optionally solvent, water, catalyst, curing agent, accelerator, plasticizer, stabilizer, antioxidant, light stabilizer, filler, dye, pigment, fragrance, preservative, or mixtures thereof.

4. A low-misting two component adhesive for bonding layers of a flexible packaging laminate consisting of two co-reactive components, Component A and Component B, wherein Component A comprises an isocyanate-functionalized compound and optionally solvent, water, catalyst, curing agent, accelerator, plasticizer, stabilizer, antioxidant, light stabilizer, filler, dye, pigment, fragrance, preservative, or mixtures thereof, and Component B consists of about 15% by weight to about 75% by weight (based on the total weight of Component B) of at least one high functionality polyol containing at least four hydroxyl groups per molecule, said high functionality polyol being selected from the group consisting of:
  (i) a polyester polyol of the formula $(HO)_m(R^1)-O-C(=O)-R^2-C(=O)-O-(R^3)(OH)_n$ wherein $-O-R^1(OH)_m$ and $-O-R^3(OH)_n$ are each, independently, residues selected trimethylolpropane, pentaerythritol and polyols where $R^1$ and $R^3$ are each, independently, linear, aliphatic cyclic, or aromatic hydrocarbyls; $R^2$ is selected from $C_2$-$C_{20}$ hydrocarbyl radicals; each of m and n are at least one and m+n is at least 4;
  (ii) a polyester polyol of the formula $(HO)_q(R^4)-O-C(=O)-R^5-C(=O)-O-R^6-O-C(=O)-R^7-C(=O)-O-(R^8)(OH)_r$ wherein $-O-R^4(OH)_m$ and $-O-R^8(OH)_n$ are each, independently, selected from residues of trimethylolpropane, pentaerythritol and polyols where $R^4$ and $R^8$ are each, independently, linear, aliphatic cyclic, or aromatic hydrocarbyls; $R^5$ and $R^7$ are each, independently, $C_2$-$C_{20}$ hydrocarbyl radicals; $R^6$ is a polyoxyalkylene radical, linear aliphatic, cycloaliphatic or aryl group, q and r are at least one and q+r is at least 4; and
  (iii) a polyester polyol that is the reaction product of (a) at least one of ethylene glycol, diethylene glycol, 1,6-hexanediol and (b) a carboxylic acid containing four or more carboxylic acid groups per molecule; and at least one lower functionality polymeric polyol compatible with the at least one high functionality polyol and selected from the group consisting of difunctional polymeric polyols; trifunctional polymeric polyols; difunctional polymeric polyols and at least one monomeric polyol having three hydroxyl groups per molecule; and trifunctional polymeric polyols and at least one monomeric polyol having three hydroxyl groups per molecule; and combinations thereof; said difunctional and trifunctional polymeric polyols being selected from at least one of:
  (a) one or more polyester polyols obtained from reacting one or more dibasic acid or diester or anhydride thereof with one or more of ethylene glycol, diethylene glycol, triethylene glycol, 1,6-hexanediol and polycaprolactone polyol; and
  (b) one or more polyether polyols;

and optionally solvent, water, catalyst, curing agent, accelerator, plasticizer, stabilizer, antioxidant, light stabilizer, filler, dye, pigment, fragrance, preservative, or mixtures thereof;

wherein Component B contains at least one monomeric polyol having three hydroxyl groups per molecule.

5. The two component laminating adhesive of claim 4 wherein the at least one high functionality polyol is obtained by reacting a trifunctional polyol and a dicarboxylic acid or diester or anhydride thereof.

6. The two component laminating adhesive of claim 4 wherein the at least one high functionality polyol is obtained by reacting (a) at least one trifunctional polyol selected from the group consisting of glycerin, trimethylolpropane, trimethylolethane, 1,2,4-butanetriol, and trifunctional polyether polyols and (b) at least one $C_4$-$C_{18}$ dicarboxylic acid or diester or anhydride thereof, wherein said at least one trifunctional polyol is in molar excess relative to the at least one $C_4$-$C_{18}$ dicarboxylic acid or diester or anhydride thereof.

7. The two component laminating adhesive of claim 4 wherein the at least one high functionality polyol is obtained by reacting (a) glycerin with (b) at least one $C_4$-$C_8$ linear saturated aliphatic dicarboxylic acid, wherein the molar ratio (a):(b) is about 2:1.

8. The two component laminating adhesive of claim 4, wherein the at least one high functionality polyol has a structure as follows:

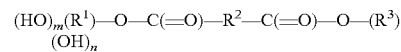

wherein $-O-R^1(OH)_m$ and $-O-R^3(OH)_n$ are each, independently, selected from residues of trimethylolpropane, pentaerythritol and polyols where $R^1$ and $R^3$ are each, independently, $C_2$-$C_{20}$ linear, aliphatic cyclic, or aromatic hydrocarbyls; $R^2$ is selected from $C_2$-$C_{20}$ hydrocarbyl radicals; each of m and n are at least one; and m+n is at least 4.

9. A low-misting two component adhesive for bonding layers of a flexible packaging laminate consisting of two co-reactive components, Component A and Component B, wherein Component A comprises an isocyanate-functionalized compound and optionally solvent, water, catalyst, curing agent, accelerator, plasticizer, stabilizer, antioxidant, light stabilizer, filler, dye, pigment, fragrance, preservative, or mixtures thereof, and Component B consists of about 15% by weight to about 75% by weight (based on the total weight of Component B) of at least one high functionality polyol containing at least four hydroxyl groups per molecule, wherein the at least one high functionality polyol has a structure as follows:

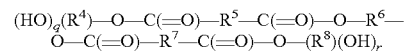

wherein $-O-R^4(OH)_m$ and $-O-R^8(OH)_n$ are each, independently, selected from residues of trimethylolpropane, pentaerythritol and polyols where $R^4$ and $R^8$ are each, independently, $C_2$-$C_{20}$ linear, aliphatic cyclic, or aromatic hydrocarbyls; $R^5$ and $R^7$ are each, independently, $C_2$-$C_{20}$ hydrocarbyl radicals; $R^6$ is a polyoxyalkylene radical, linear aliphatic, cycloaliphatic or aryl group, q and r are at least one and q+r is at least 4; and at least one lower functionality polymeric polyol compatible with the at least one high functionality polyol and selected from the group consisting of difunctional polymeric polyols; trifunctional polymeric polyols; difunctional polymeric polyols and at least one monomeric polyol having three hydroxyl groups per molecule; and trifunctional polymeric polyols and at least one monomeric polyol having three hydroxyl groups per molecule; and combinations thereof; said difunctional and trifunctional polymeric polyols being selected from at least one of:
  (a) one or more polyester polyols obtained from reacting one or more dibasic acid or diester or anhydride thereof with one or more of ethylene glycol, diethylene glycol, triethylene glycol, 1,6-hexanediol and polycaprolactone polyol; and
  (b) one or more polyether polyols;
and optionally solvent, water, catalyst, curing agent, accelerator, plasticizer, stabilizer, antioxidant, light stabilizer, filler, dye, pigment, fragrance, preservative, or mixtures thereof.

10. A laminate comprised of at least one polymeric film and the two component laminating adhesive of claim 4 in cured form.

11. The laminate of claim 10 comprised of at least two polymeric films, wherein the two component laminating adhesive is located between two of said polymeric films and adheres said polymeric films to each other.

12. The laminate of claim 10 wherein at least one polymeric film is comprised of a thermoplastic selected from the group consisting of polyethylene terephthalate, polyethylene, polypropylene, and polyvinylidene chloride.

13. The laminate of claim 10 additionally comprising a metal foil, wherein the laminating adhesive is located between the metal foil and at least one polymeric film.

14. A method of making a flexible film laminate, said method comprising a) combining Component A and Component B of the two component laminating adhesive of claim 4 to form an adhesive mixture, b) joining a first flexible film and a second flexible film using the adhesive mixture interposed between the first flexible film and the second flexible film, and c) curing the adhesive mixture.

15. The two component laminating adhesive of claim 1, wherein Component A has a viscosity not greater than 10,000 cps at 25 degrees C.

16. The two component laminating adhesive of claim 1, wherein Component A has a viscosity not greater than 3,500 cps at 25 degrees C.

17. A low-misting two component adhesive for bonding layers of a flexible packaging laminate consisting of two co-reactive components, Component A and Component B, wherein
  Component A comprises an isocyanate-functionalized compound and optionally solvent, water, catalyst, curing agent, accelerator, plasticizer, stabilizer, antioxidant, light stabilizer, filler, dye, pigment, fragrance, preservative, or mixtures thereof, and
  Component B consists of
  about 15% by weight to about 75% by weight (based on the total weight of Component B) of at least one high functionality polyol containing at least four hydroxyl groups per molecule, wherein the at least one high functionality polyol is obtained by reacting a difunctional polyol and a dicarboxylic acid to form a carboxylic acid-functionalized diester and reacting the carboxylic acid-functionalized diester with a trifunctional polyol; and
  at least one lower functionality polymeric polyol compatible with the at least one high functionality polyol and selected from the group consisting of difunctional polymeric polyols; trifunctional polymeric polyols; difunctional polymeric polyols and at least one monomeric polyol having three hydroxyl groups per molecule; and trifunctional polymeric polyols and at least one monomeric polyol having three hydroxyl groups per molecule; and combinations thereof; said difunctional and trifunctional polymeric polyols being selected from at least one of:
    (a) one or more polyester polyols obtained from reacting one or more dibasic acid or diester or anhydride thereof with one or more of ethylene glycol, diethylene glycol, triethylene glycol, 1,6-hexanediol and polycaprolactone polyol; and
    (b) one or more polyether polyols;
  and optionally solvent, water, catalyst, curing agent, accelerator, plasticizer, stabilizer, antioxidant, light stabilizer, filler, dye, pigment, fragrance, preservative, or mixtures thereof.

18. The two component laminating adhesive of claim 17, wherein the at least one high functionality polyol is obtained by reacting at least one difunctional polyether polyol and at least one $C_4$-$C_{18}$ dicarboxylic acid to form a carboxylic acid-functionalized polyether and reacting the carboxylic acid-functionalized polyether with at least one trifunctional polyol selected from the group consisting of glycerin, trimethylolpropane, trimethylolethane, 1,2,4-butanetriol, and trifunctional polyether polyols.

19. The two component laminating adhesive of claim 17, wherein the at least one high functionality polyol is obtained by reacting at least one difunctional polypropylene glycol and at least one $C_4$-$C_8$ saturated aliphatic dicarboxylic acid at a molar ratio of about 1:2 to form a carboxylic acid-functionalized polypropylene glycol and reacting the carboxylic acid-functionalized polypropylene glycol with glycerin at a molar ratio of about 1:2.

* * * * *